United States Patent
Aher et al.

(10) Patent No.: US 12,229,527 B2
(45) Date of Patent: *Feb. 18, 2025

(54) METHODS AND SYSTEMS FOR PROVIDING SUBTITLES

(71) Applicant: Adeia Guides Inc., San Jose, CA (US)

(72) Inventors: Ankur Anil Aher, Maharashtra (IN); Charishma Chundi, Andhra Pradesh (IN)

(73) Assignee: Adeia Guides Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/517,658

(22) Filed: Nov. 22, 2023

(65) Prior Publication Data

US 2024/0160863 A1 May 16, 2024

Related U.S. Application Data

(63) Continuation of application No. 17/165,451, filed on Feb. 2, 2021, now Pat. No. 11,875,133.

(51) Int. Cl.
*G06F 40/58* (2020.01)
*G10L 21/10* (2013.01)

(52) U.S. Cl.
CPC .............. *G06F 40/58* (2020.01); *G10L 21/10* (2013.01)

(58) Field of Classification Search
CPC .................................. G06F 40/58; G10L 21/10
See application file for complete search history.

(56) References Cited

U.S. PATENT DOCUMENTS

| | | |
|---|---|---|
| 9,043,196 B1 | 5/2015 | Leydon et al. |
| 10,311,144 B2 | 6/2019 | Bellegarda et al. |
| 11,455,466 B2 | 9/2022 | Zhang et al. |
| 2010/0174707 A1 | 7/2010 | Kudo et al. |
| 2013/0051661 A1 | 2/2013 | Robinson et al. |
| 2014/0337989 A1 | 11/2014 | Orsini et al. |
| 2015/0046148 A1 | 2/2015 | Oh et al. |
| 2017/0139955 A1 | 5/2017 | Dutta et al. |
| 2017/0263143 A1 | 9/2017 | Venkataratnam |
| 2017/0308290 A1 | 10/2017 | Patel |
| 2019/0356948 A1 | 11/2019 | Stojancic et al. |
| 2021/0152501 A1 | 5/2021 | Rai |
| 2021/0334708 A1 | 10/2021 | Li et al. |
| 2021/0383793 A1 | 12/2021 | Saito |
| 2022/0068296 A1 | 3/2022 | Wilson et al. |

*Primary Examiner* — Jesse S Pullias
*Assistant Examiner* — Michael C. Lee
(74) *Attorney, Agent, or Firm* — Haley Guiliano LLP

(57) ABSTRACT

Systems and methods are described for providing subtitles for a media content item. Subtitles are obtained, using control circuitry, for the media content item. Control circuitry determines whether a character component of the subtitles should be replaced by an image component. In response to determining that the character component of the subtitles should be replaced by an image component, control circuitry selects, from memory, an image component corresponding to the character component. Control circuitry replaces the character component of the subtitles by the image component to generate modified subtitles.

20 Claims, 6 Drawing Sheets

METHODS AND SYSTEMS FOR PROVIDING SUBTITLES

CROSS-REFERENCE TO RELATED APPLICATIONS

This application is a continuation of U.S. patent application Ser. No. 17/165,451, filed Feb. 2, 2021. The disclosure of which is hereby incorporated by references herein in its entirety.

BACKGROUND

The present disclosure relates to methods and systems for providing subtitles, and in particular, but not exclusively, to providing modified subtitles having a mixture of text and images.

SUMMARY

It is common for individuals to use captions or subtitles to aid the understanding of media content, e.g., by providing a transcription of an audio portion of a program and/or commentary on the program as it occurs. For example, a user may wish to watch a media content item without sound, or a user may wish to have the audio portion of the media content translated into another language. In such cases, the user may request user equipment to display captions or subtitles when displaying the media content item.

However, there are several problems associated with the display of captions and subtitles. For example, the user may not be familiar with certain words or phrases displayed in the captions/subtitles. Additionally or alternatively, where the captions/subtitles are translated from the language of the media content item, it may not be possible to provide an exact translation, since the language of the translation may not have an appropriate word or phrase to describe the language used in the audio component of the original media content item. In such cases, the captions/subtitles may use related or generic terms that do not accurately convey information imperative to the understanding of the media content item, such as the mood or emotion of a character in the media content item. Further, when captions/subtitles are presented in a language not matching the media content item language, the translated text in the captions/subtitles may be a different length compared to what the text representing the media content item language would be, which may offset the captions/subtitles from the visual component of the media content item. More broadly, even where the captions/subtitles are not translated, the dialogue in the media content item may be sufficiently fast-paced such that the user may find it difficult to read a portion of the captions/subtitles before the next portion of the captions/subtitles appears on the screen.

Systems and methods are provided herein for providing improved subtitles and/or captions that help a user's understanding of a media content item, e.g., by substituting a textual component of the subtitles/captions with an image component. For the avoidance of doubt, the systems and methods provided herein apply equally to subtitles and captions. For example, in some jurisdictions the term subtitles is taken to mean a textual description that is used when the viewer can hear but cannot understand the language or accent, or the speech is not entirely clear, and so subtitles may transcribe only dialogue and some on-screen text. Captions may aim to describe to the deaf and hard of hearing all significant audio content, such as spoken dialogue and non-speech information such as the identity of speakers and, occasionally, their manner of speaking, along with any significant music or sound effects using words or symbols. However, in other jurisdictions, the term subtitles does not distinguish between subtitles and captions. Thus, for the sake of brevity throughout the following disclosure, the term subtitles will be used to mean subtitles and/or captions.

According to some examples of the systems and methods provided herein, subtitles are obtained for a media content item, e.g., using control circuitry of user equipment. In some examples, the subtitles are parsed, using the control circuitry, to categorize the components of the subtitles, into categories such as words and phrases, and/or types of words, such as nouns, adjectives and verbs. In some examples, control circuitry determines whether it is possible to replace a component of the subtitles with an image, e.g., based on the categorization of the components of the subtitles.

Control circuitry determines whether a character component of the subtitles should be replaced by an image component, e.g., in response to determining that it is possible to replace a component of the subtitles with an image. In some examples, control circuitry may determine if the character component of the subtitles should be replaced by the image component by determining if the character component is greater than a predetermined length. For example, determining if the character component is greater than a predetermined length may comprise determining at least one of the number of characters in the character component and the audio length of the character component. In some examples, control circuitry may determine if the character component of the subtitles should be replaced by the image component by determining if the character component is difficult to understand, such as by determining whether a comprehension difficulty rating of the character component exceeds a predetermined or configurable threshold. For example, determining if the character component is difficult to understand may comprise at least one of determining a difficulty rating of the character component and/or determining a language ability level of a user.

An image is selected, e.g., from memory, for use as an image component in the subtitles corresponding to the character component, e.g., in response to determining that the character component of the subtitles should be replaced by an image component. The character component of the subtitles is replaced by the image component to generate modified subtitles.

In some examples, an audio component of the media content item is translated from a first language into a second language to obtain the subtitles. Control circuitry may determine if one or more portions of the subtitles could not be translated into the second language. In some examples, determining if the character component of the subtitles should be replaced by an image component comprises determining if the subtitles comprise a character component that could not (or cannot) be translated into the second language. For example, where the subtitles comprise a character component that could not be translated into the second language, it may be desirable to replace the character component that could not be translated into the second language by an image.

In some examples, metadata of the media content item is accessed, e.g., to determine the content of one or more frames of the media content item. In some examples, one or more databases are accessed containing a plurality of images. An image corresponding to the character component may be selected from the one or more databases. In some examples, the image may be selected as an image component to replace a character component of the subtitles, e.g., based on a comparison between the metadata of the media content item and the metadata of the image.

In some examples, metadata of a consumed portion of the media content item may be accessed. For example, metadata of one or more frames of the consumed portion of the media content item may be accessed to determine the visual composition of the frame. In some examples, control circuitry determines whether the consumed portion of the media content item comprises a frame containing an image corresponding to the character component based on the metadata of one or more frames of the consumed portion of the media content item. A frame of the consumed portion of the media content item containing an image corresponding to the character component may be selected as the image component to replace a character component of the subtitles, e.g., based on a comparison between the metadata of the media content item and metadata of the image.

In some examples, the consumed portion of the media content item may comprise a plurality of frames containing an image corresponding to the character component. A frame of the consumed portion of the media content item may be selected from the plurality of frames as the image component based on at least one of the elapsed time between the display of the frame in the consumed portion of the media content item and the time of the generation of the subtitles, the clarity of the image corresponding to the character component in the frame, and the size of the image in the frame, e.g., the size of the image relative to other components of the frame.

BRIEF DESCRIPTION OF THE DRAWINGS

The above and other objects and advantages of the disclosure will be apparent upon consideration of the following detailed description, taken in conjunction with the accompanying drawings, in which like reference characters refer to like parts throughout, and in which.

DETAILED DESCRIPTION

Figure 1:
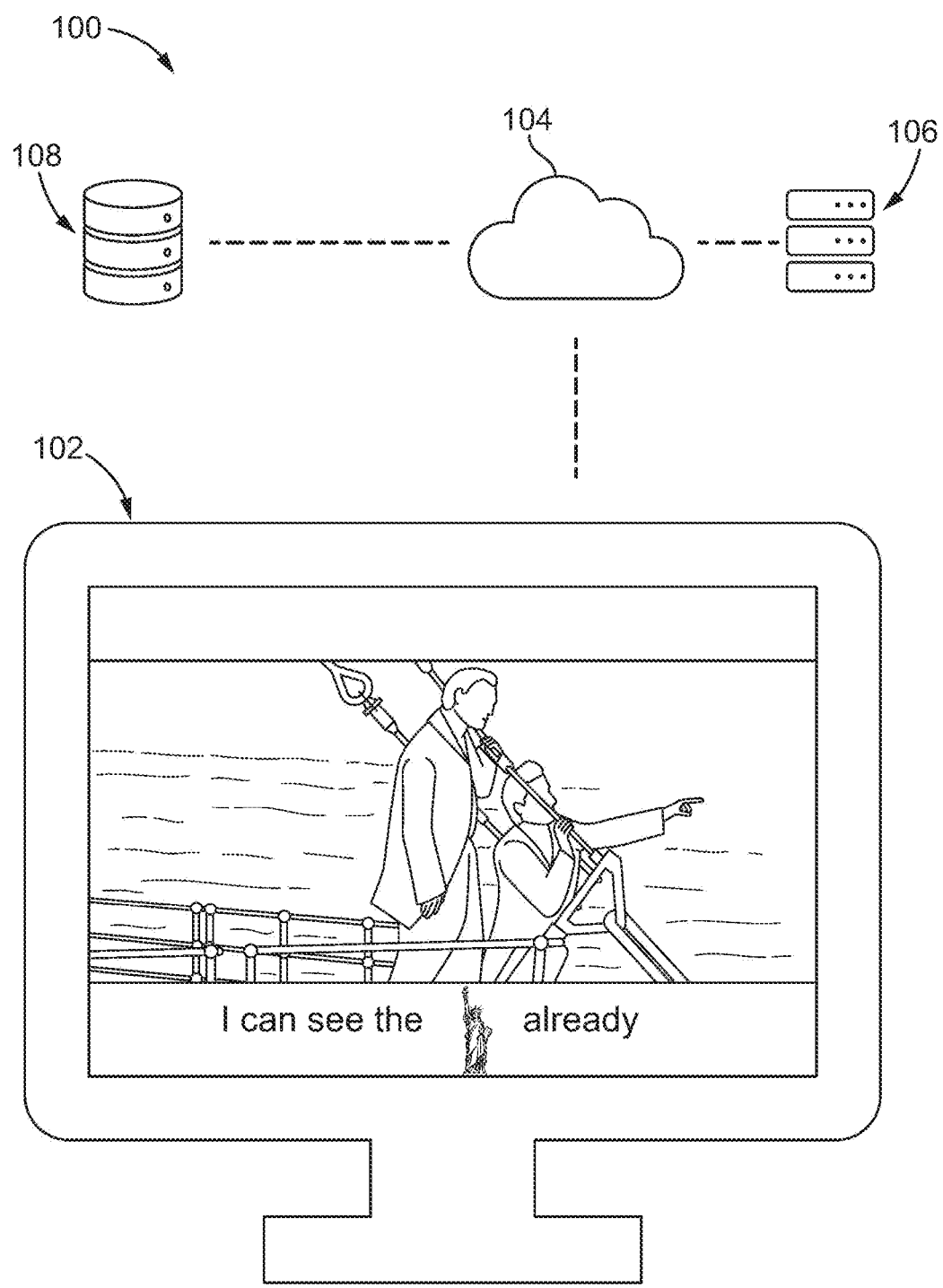
FIG. 1 illustrates an overview of a system that provides modified subtitles, in accordance with some examples of the disclosure.

FIG. 1 illustrates an overview of a system 100 that provides modified subtitles, in accordance with some examples of the disclosure. In some examples, system 100 includes user equipment 102, such as a tablet computer, a smartphone, a smart television, or the like, configured to display media content to the user. System 100 may also include network 104, such as the Internet, configured to communicatively couple user equipment 102 to one or more servers 106 and/or one or more content databases 108 from which media content may be obtained for display on the user equipment 102. User equipment 102 and server 106 may be communicatively coupled to one another by way of network 104, and server 106 may be communicatively coupled to content database 108 by way of one or more communication paths, such as a proprietary communication path and/or network 104.

In some examples, system 100 may comprise an application that provides guidance through an interface, e.g., a graphical user interface, that allows users to efficiently navigate media content selections and easily identify media content that they may desire, such as content provided on a database on one or more live streams. Such guidance is referred to herein as an interactive content guidance application or, sometimes, a content guidance application, a media guidance application, or a guidance application. In some examples, the application may be configured to provide modified subtitles for a content item being displayed to a user, e.g., based on subtitle data for a content item. For example, the application may provide the user with a selectable option for the display of modified subtitles that can improve the user's understanding of a content item displayed on user equipment 102.

Interactive media guidance applications may take various forms, depending on the content for which they provide guidance. One typical type of media guidance application is an interactive television program guide. Interactive television program guides (sometimes referred to as electronic program guides) are well-known guidance applications that, among other things, allow users to navigate among and locate many types of content or media assets. Interactive media guidance applications may generate graphical user interface screens that enable a user to navigate among, locate and select content. As referred to herein, the terms "media asset", "content items" and "content" should each be understood to mean an electronically consumable user asset, such as television programming, as well as pay-per-view programs, on-demand programs (as in video-on-demand (VOD) systems), Internet content (e.g., streaming content, downloadable content, Webcasts, etc.), video clips, audio, content information, pictures, rotating images, documents, playlists, websites, articles, books, electronic books, blogs, chat sessions, social media, applications, games, and/or any other media or multimedia and/or combination of the same. Guidance applications also allow users to navigate amid and locate content. As referred to herein, the term "multimedia" should be understood to mean content that utilizes at least two different content forms described above, for example, text, audio, images, video, or interactivity content forms. Content may be recorded, played, displayed or accessed by user equipment devices, but can also be part of a live performance.

The media guidance application and/or any instructions for performing any of the examples discussed herein may be encoded on computer-readable media. Computer-readable media includes any media capable of storing data. The computer-readable media may be transitory, including, but not limited to, propagating electrical or electromagnetic signals, or may be non-transitory, including, but not limited to, volatile and non-volatile computer memory or storage devices such as a hard disk, floppy disk, USB drive, DVD, CD, media card, register memory, processor cache, random access memory (RAM), etc.

With the ever-improving capabilities of the Internet, mobile computing, and high-speed wireless networks, users are accessing media on user equipment devices on which they traditionally did not. As referred to herein, the phrases "user equipment device," "user equipment," "user device,"

"electronic device," "electronic equipment," "media equipment device," or "media device" should be understood to mean any device for accessing the content described above, such as a television, a Smart TV, a set-top box, an integrated receiver decoder (IRD) for handling satellite television, a digital storage device, a digital media receiver (DMR), a digital media adapter (DMA), a streaming media device, a DVD player, a DVD recorder, a connected DVD, a local media server, a BLU-RAY player, a BLU-RAY recorder, a personal computer (PC), a laptop computer, a tablet computer, a WebTV box, a personal computer television (PC/TV), a PC media server, a PC media center, a hand-held computer, a stationary telephone, a personal digital assistant (PDA), a mobile telephone, a portable video player, a portable music player, a portable gaming machine, a smartphone, or any other television equipment, computing equipment, or wireless device, and/or combination of the same. In some examples, the user equipment device may have a front-facing screen and a rear-facing screen, multiple front screens, or multiple angled screens. In some examples, the user equipment device may have a front-facing camera and/or a rear-facing camera. On these user equipment devices, users may be able to navigate among and locate the same content available through a television. Consequently, media guidance may be available on these devices, as well. The guidance provided may be for content available only through a television, for content available only through one or more of other types of user equipment devices, or for content available through both a television and one or more of the other types of user equipment devices. The media guidance applications may be provided as online applications (i.e., provided on a website), or as stand-alone applications or clients on user equipment devices. Various devices and platforms that may implement media guidance applications are described in more detail below.

One of the functions of the media guidance application is to provide media guidance data to users. As referred to herein, the phrase "media guidance data" or "guidance data" should be understood to mean any data related to content or data used in operating the guidance application. For example, the guidance data may include program information, subtitle data, guidance application settings, user preferences, user profile information, media listings, media-related information (e.g., broadcast times, broadcast channels, titles, descriptions, ratings information (e.g., parental control ratings, critics' ratings, etc.), genre or category information, actor information, logo data for broadcasters' or providers' logos, etc.), media format (e.g., standard definition, high definition, 3D, etc.), on-demand information, blogs, websites, and any other type of guidance data that is helpful for a user to navigate among and locate desired content selections.

Figure 2:
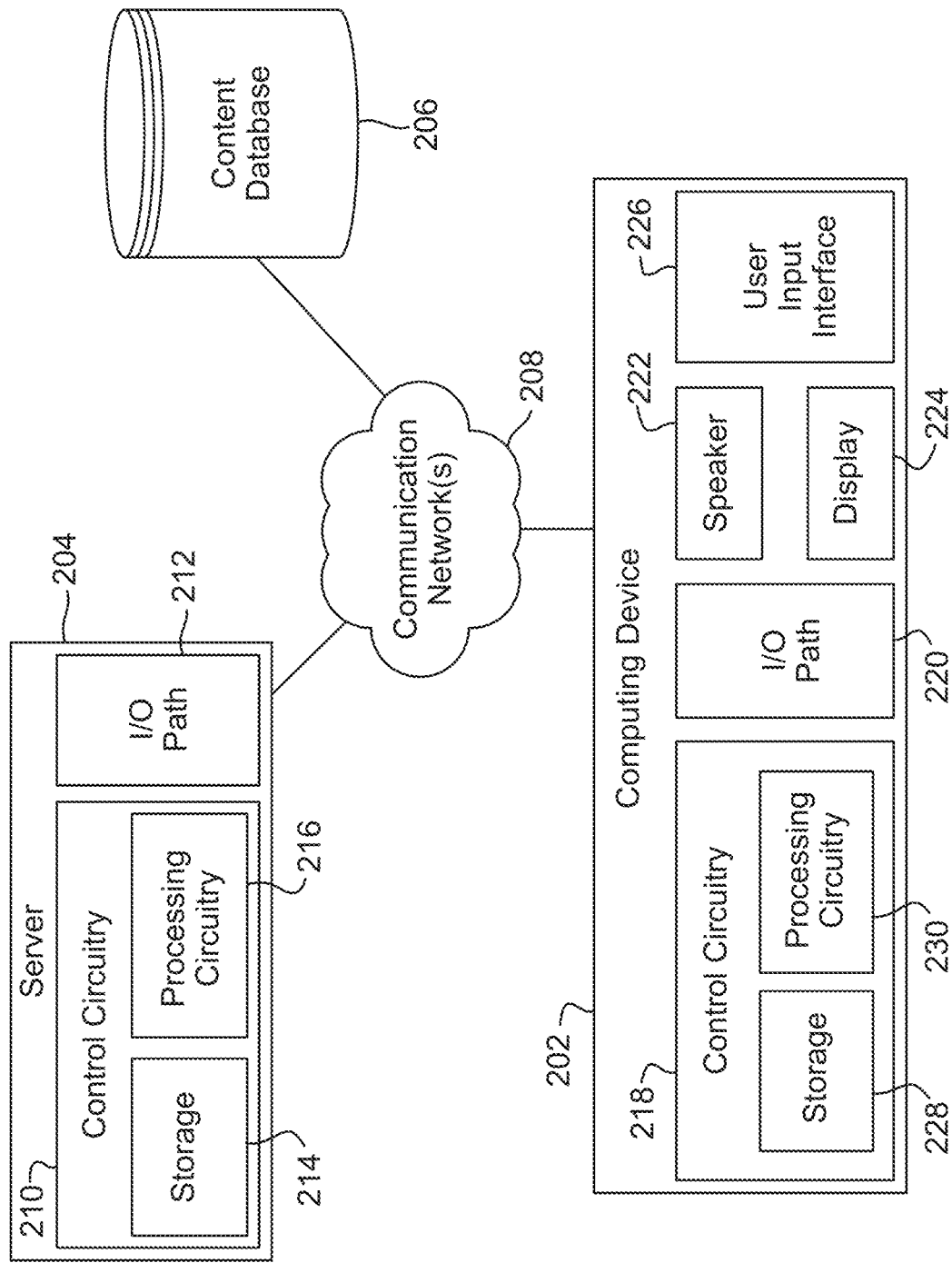
FIG. 2 is a block diagram showing components of an exemplary system for providing modified subtitles, in accordance with some examples of the disclosure.

FIG. 2 is an illustrative block diagram showing exemplary system 200 configured to provide modified subtitles for display to a user while consuming media content. Although FIG. 2 shows system 200 as including a number and configuration of individual components, in some examples, any number of the components of system 200 may be combined and/or integrated as one device, e.g., as user equipment 102. System 200 includes computing device 202, server 204, and content database 206, each of which is communicatively coupled to communication network 208, which may be the Internet or any other suitable network or group of networks. In some examples, system 200 excludes server 204, and functionality that would otherwise be implemented by server 204 is instead implemented by other components of system 200, such as computing device 202. In still other examples, server 204 works in conjunction with computing device 202 to implement certain functionality described herein in a distributed or cooperative manner.

Server 204 includes control circuitry 210 and input/output (hereinafter "I/O") path 212, and control circuitry 210 includes storage 214 and processing circuitry 216. Computing device 202, which may be a personal computer, a laptop computer, a tablet computer, a smartphone, a smart television, a smart speaker, or any other type of computing device, includes control circuitry 218, I/O path 220, speaker 222, display 224, and user input interface 226, which in some examples provides a user selectable option for enabling and disabling the display of modified subtitles. Control circuitry 218 includes storage 228 and processing circuitry 230. Control circuitry 210 and/or 218 may be based on any suitable processing circuitry such as processing circuitry 216 and/or 230. As referred to herein, processing circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores). In some examples, processing circuitry may be distributed across multiple separate processors, for example, multiple of the same type of processors (e.g., two Intel Core i9 processors) or multiple different processors (e.g., an Intel Core i7 processor and an Intel Core i9 processor).

Each of storage 214, storage 228, and/or storages of other components of system 200 (e.g., storages of content database 206, and/or the like) may be an electronic storage device. As referred to herein, the phrase "electronic storage device" or "storage device" should be understood to mean any device for storing electronic data, computer software, or firmware, such as random-access memory, read-only memory, hard drives, optical drives, digital video disc (DVD) recorders, compact disc (CD) recorders, BLU-RAY disc (BD) recorders, BLU-RAY 3D disc recorders, digital video recorders (DVRs, sometimes called personal video recorders, or PVRs), solid state devices, quantum storage devices, gaming consoles, gaming media, or any other suitable fixed or removable storage devices, and/or any combination of the same. Each of storage 214, storage 228, and/or storages of other components of system 200 may be used to store various types of content, metadata, and or other types of data. Non-volatile memory may also be used (e.g., to launch a boot-up routine and other instructions). Cloud-based storage may be used to supplement storages 214, 228 or instead of storages 214, 228. In some examples, control circuitry 210 and/or 218 executes instructions for an application stored in memory (e.g., storage 214 and/or 228). Specifically, control circuitry 214 and/or 228 may be instructed by the application to perform the functions discussed herein. In some implementations, any action performed by control circuitry 214 and/or 228 may be based on instructions received from the application. For example, the application may be implemented as software or a set of executable instructions that may be stored in storage 214 and/or 228 and executed by control circuitry 214 and/or 228. In some examples, the application may be a client/server application where only a client application resides on computing device 202, and a server application resides on server 204.

The application may be implemented using any suitable architecture. For example, it may be a stand-alone application wholly implemented on computing device 202. In such an approach, instructions for the application are stored locally (e.g., in storage 228), and data for use by the application is downloaded on a periodic basis (e.g., from an out-of-band feed, from an Internet resource, or using another suitable approach). Control circuitry 218 may retrieve instructions for the application from storage 228 and process the instructions to perform the functionality described herein. Based on the processed instructions, control circuitry 218 may determine what action to perform when input is received from user input interface 226.

In client/server-based examples, control circuitry 218 may include communication circuitry suitable for communicating with an application server (e.g., server 204) or other networks or servers. The instructions for carrying out the functionality described herein may be stored on the application server. Communication circuitry may include a cable modem, an Ethernet card, or a wireless modem for communication with other equipment, or any other suitable communication circuitry. Such communication may involve the Internet or any other suitable communication networks or paths (e.g., communication network 208). In another example of a client/server-based application, control circuitry 218 runs a web browser that interprets web pages provided by a remote server (e.g., server 204). For example, the remote server may store the instructions for the application in a storage device. The remote server may process the stored instructions using circuitry (e.g., control circuitry 210) and/or generate displays. Computing device 202 may receive the displays generated by the remote server and may display the content of the displays locally via display 224. This way, the processing of the instructions is performed remotely (e.g., by server 204) while the resulting displays, such as the display windows described elsewhere herein, are provided locally on computing device 202. Computing device 202 may receive inputs from the user via input interface 226 and transmit those inputs to the remote server for processing and generating the corresponding displays.

A user may send instructions, e.g., to request modified subtitles, to control circuitry 210 and/or 218 using user input interface 226. User input interface 226 may be any suitable user interface, such as a remote control (e.g., remote control), trackball, keypad, keyboard, touchscreen, touchpad, stylus input, joystick, voice recognition interface, gaming controller, or other user input interfaces. User input interface 226 may be integrated with or combined with display 224, which may be a monitor, a television, a liquid crystal display (LCD), an electronic ink display, or any other equipment suitable for displaying visual images.

Server 204 and computing device 202 may transmit and receive content and data via I/O path 212 and 220, respectively. For instance, I/O path 212 and/or I/O path 220 may include a communication port(s) configured to transmit and/or receive (for instance to and/or from content database 206), via communication network 208, content item identifiers, content metadata, natural language queries, and/or other data. Control circuitry 210, 218 may be used to send and receive commands, requests, and other suitable data using I/O paths 212, 220.

Figure 3:
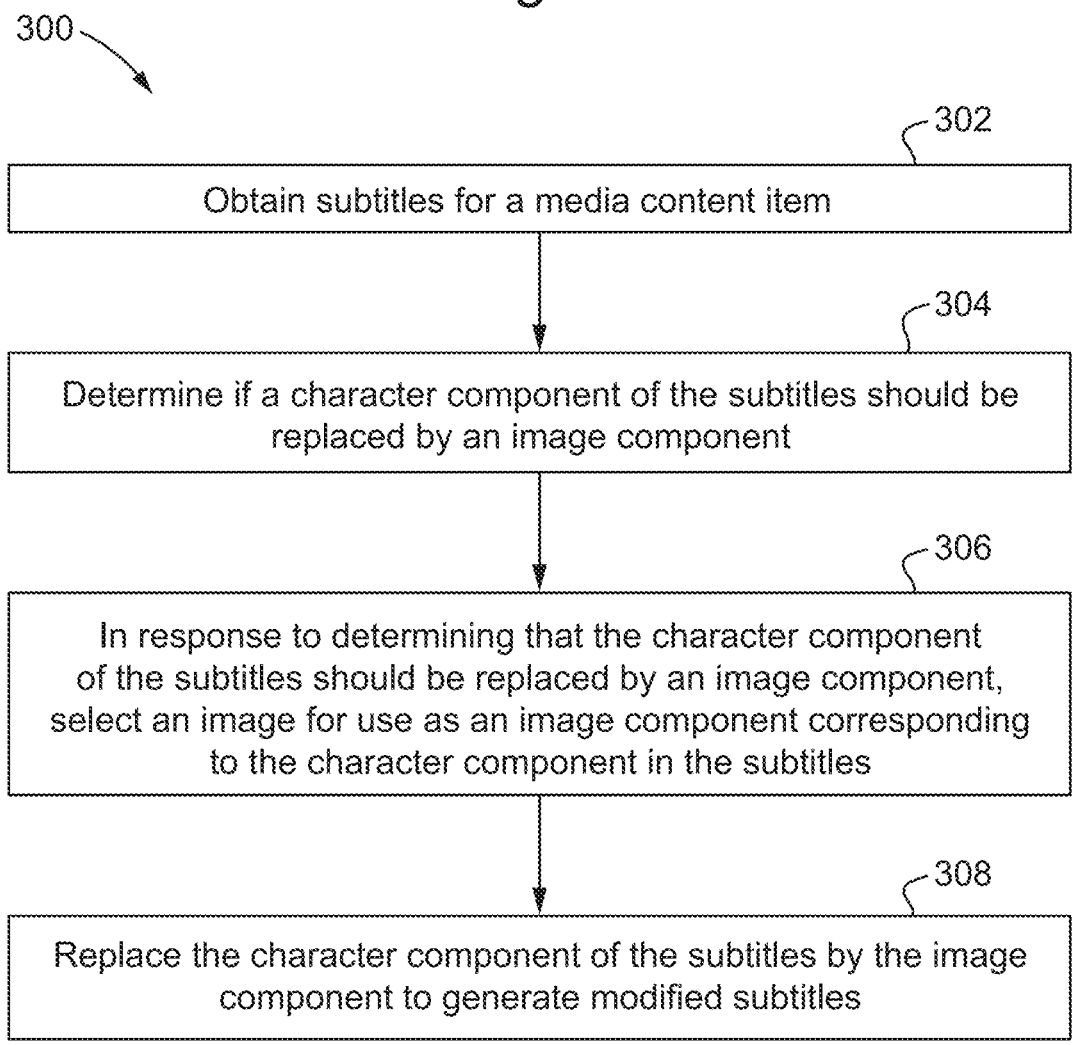
FIG. 3 is a flowchart representing a process for generating modified subtitles, in accordance with some examples of the disclosure.

FIG. 3 is a flowchart representing an illustrative process 300 for generating modified subtitles, in accordance with some examples of the disclosure. While the example shown in FIG. 3 refers to the use of system 100, as shown in FIG. 1, it will be appreciated that the illustrative process shown in FIG. 3, and any of the other following illustrative processes, may be implemented on system 100 and system 200, either alone or in combination, or on any other appropriately configured system architecture.

At step 302, subtitles for a media content item are obtained by user equipment 102. For example, control circuitry of user equipment 102 may obtain subtitles using data provided by a content provider, e.g., data transmitted as part of streamed media content or as part of a live stream or broadcast; from data stored on memory of user equipment 102; and/or any other appropriate storage module, such as a storage module on a server of a content provider. In some examples, where subtitle data is not provided as part of transmitted media content, e.g., media content from an over-the-top service provider, user equipment 102 may request subtitle data corresponding to the transmitted media content from any appropriate source. In some examples, a content guidance application, e.g., implemented on user equipment 102, may generate subtitles in real time, e.g., where subtitle data is not available from a content provider or elsewhere. Referring to the example shown in FIG. 1, subtitles for the movie Titanic have been obtained. In conventional systems, the basic character-based subtitles would be displayed. For example, for the scene shown in the example of FIG. 1, a conventional system would display the text I can see the Statue of Liberty already. The present disclosure is advantageous, as it modifies the obtained subtitles, e.g., prior to the display of the subtitles, to make it easier for a user to understand the media content item.

At step 304, control circuitry of user equipment 102 determines whether a character component, such as a word or phrase, of the subtitles should be replaced by an image component, e.g., to make the subtitles more understandable for the user. For example, control circuitry may determine that the character component Statue of Liberty from the text I can see the Statue of Liberty already should be replaced by an image component, such as an picture of the Statue of Liberty, and/or an image representative of the Statue of Liberty. For example, control circuitry may determine if the character component of the subtitles should be replaced by the image component by determining if the character component is greater than a predetermined length and/or determining if the character component is difficult to understand. The process of determining if a character component should be replaced is discussed in more detail below in relation to FIGS. 4 and 5.

At step 306, in response to determining that the character component of the subtitles should be replaced by an image component, control circuitry selects an image corresponding to the character component. For example, control circuitry may access one or more image databases to retrieve an image corresponding to the character component that should be replaced. Using the above example, control circuitry may access one or more image databases to retrieve an image for the Statue of Liberty. In some examples, the selection of the image may be based on various factors, such as metadata of the content item and metadata of the image, such that an appropriate image may be selected for use as an image component corresponding to the character component in the subtitles. The process of image selection is discussed in more detail below in relation to FIGS. 4 and 5.

At step 308, control circuitry replaces the character component of the subtitles by the image component to generate modified subtitles. The modified subtitles may then be generated for display on user equipment 102. In the example shown in FIG. 1, the character component Statue of Liberty has been replaced by an image of the Statue of Liberty. In this manner, a user may more easily and/or more quickly comprehend the meaning of the subtitles.

The actions or descriptions of FIG. 3 may be used with any other example of this disclosure, e.g., the example described below in relation to FIGS. 4 and 5. In addition, the actions and descriptions described in relation to FIG. 3 may be done in any suitable alternative orders or in parallel to further the purposes of this disclosure.

Figure 4:
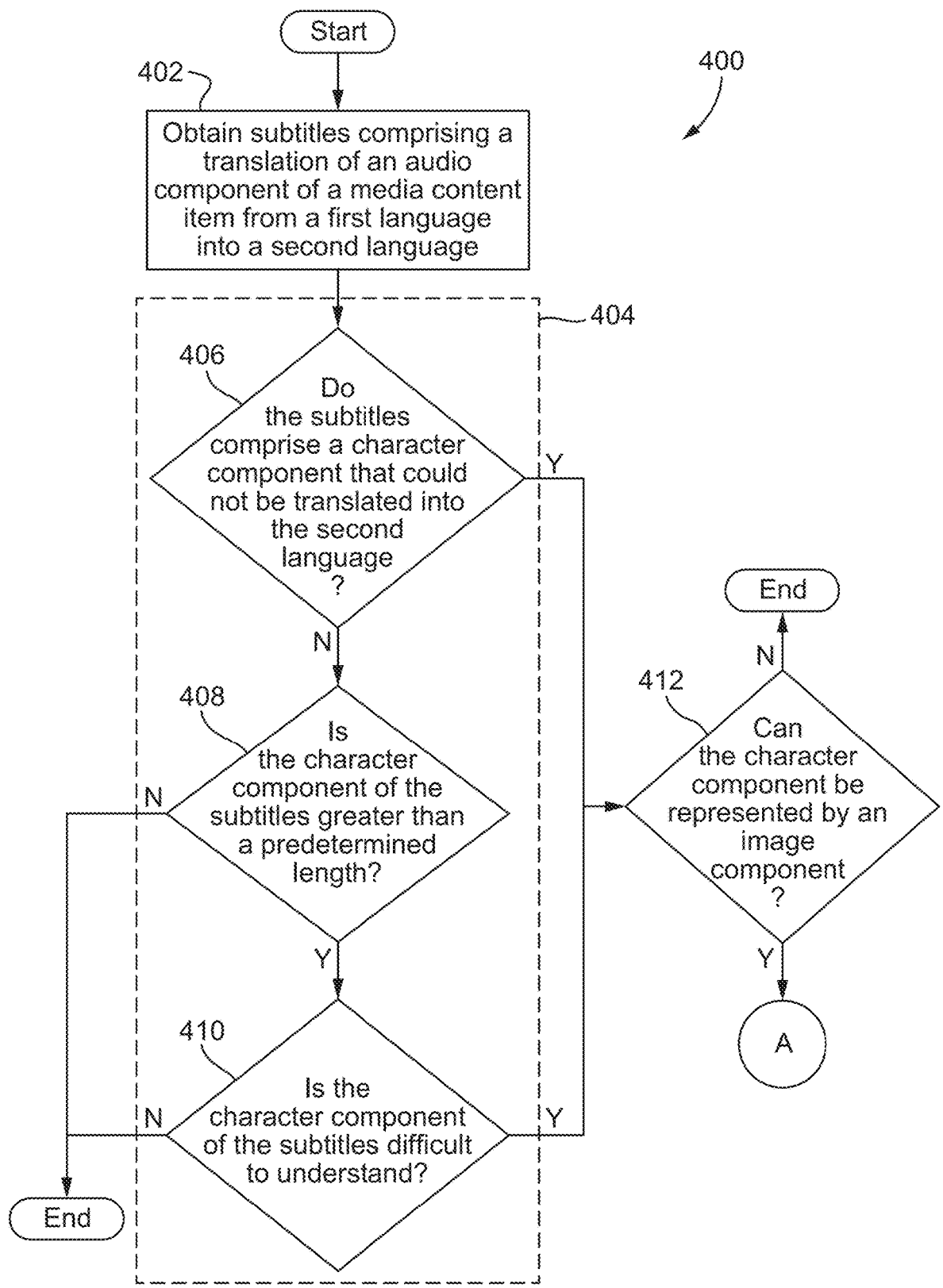
FIG. 4 is a flowchart representing a process for generating for display modified subtitles, in accordance with some examples of the disclosure.
Figure 5:
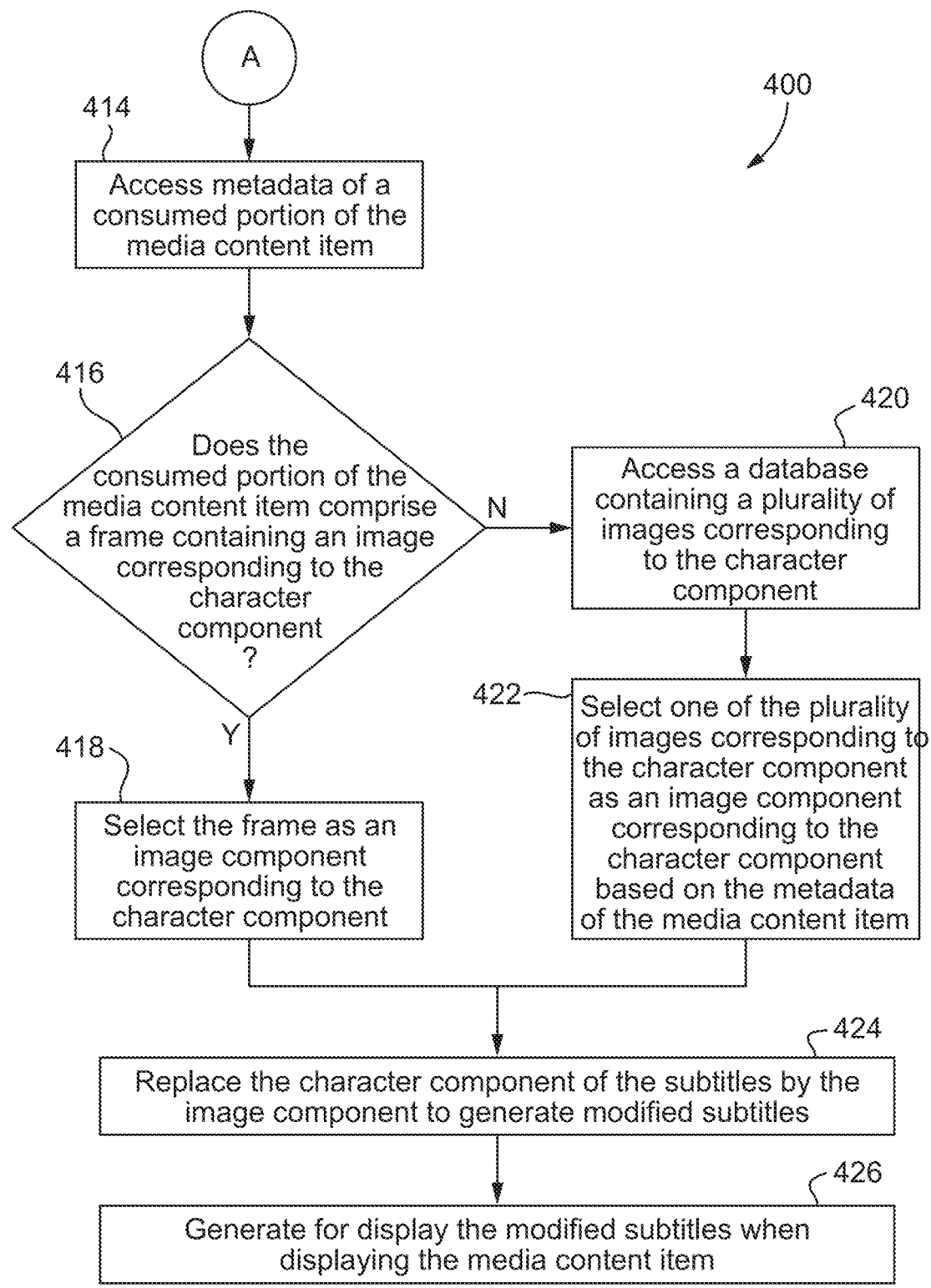
FIG. 5 is a continuation of the flowchart shown in FIG. 4, in accordance with some examples of the disclosure.

FIGS. 4 and 5 show a flowchart representing an illustrative process 400 for generating modified subtitles when displaying a media content item. While the example shown in FIGS. 4 and 5 refers to the use of system 100, as shown in FIG. 1, it will be appreciated that the illustrative process shown in FIGS. 4 and 5 may be implemented on system 100 and system 200, either alone or in combination, or on any other appropriately configured system architecture.

At step 402, control circuitry obtains subtitles comprising a translation of an audio component of a media content item from a first language into a second language. For example, it is common for a service provider to supply data enabling the user equipment 102 to display subtitles for a media content item in several languages. For example, based on the example shown in FIG. 1 for the movie Titanic, control circuitry may obtain the subtitles Ya puedo ver la Estatua de la Libertad, which is a Spanish translation of the text I can see the Statue of Liberty already. However, where a media content item has not been supplied with subtitles in a desired language, process 400 may comprise a step of translating, using control circuitry, the audio component of the media content item to produce a transcription of the audio content in the desired language that may be used as subtitles.

At step 404, control circuitry determines whether a character component, such as a word or phrase, of the subtitles should be replaced by an image component, e.g., to make the subtitles more understandable for the user. For example, control circuitry may determine that the character component la Estatua de la Libertad from the text Ya puedo ver la Estatua de la Libertad should be replaced by an image component, such as an image of the Statue of Liberty. Determining if the character component of the subtitles should be replaced by an image component may be achieved in a variety of ways. In the example shown in FIG. 4, step 404 comprises step 406, step 408 and step 410. However, step 404 need not comprise all of steps 406, 408 and 410, nor should the order of steps 406, 408 and 410 be taken as limiting.

At step 406, control circuitry determines whether the subtitles comprise a character component that could not be translated into the second language. For example, although not shown by the above example of a translation of the subtitle I can see the Statue of Liberty already into Spanish, translation of certain words or phrases of the subtitles from the first language into the second language may not be possible. At step 406, if it is determined that the subtitles do not contain a word that could not be translated, as is the case with the example Ya puedo ver la Estatua de la Libertad process 400 moves to step 408. Otherwise, step 406 moves to step 412, which is discussed later.

At step 408, control circuitry determines whether a character component of the subtitles should be replaced by an image component by determining if a character component of the subtitles is greater than a predetermined length. For example, control circuitry may determine the number of characters in the character component la Estatua de la Libertad exceeds a threshold value for the number of characters in a word or phrase. For example, the threshold value for the number of characters in a word may be set to 10 characters, such that words with fewer characters are not replaced by an image component, and words that have 10 or more characters are eligible for substitution. In this manner, shorter words, which are inherently easier for a user to read, are not replaced by an image component, and longer words that may be more difficult for a user to understand can be replaced by an image component. In some examples, the threshold value for the number of characters in a word or phrase may be set according to one or more settings in a user profile. For example, a user with a lower reading ability may choose, or have set for them, a lower threshold than a user with a higher reading ability. In this manner, a parent may be able to set the threshold value for the number of characters in a word or phrase according to the reading ability of their child, for example.

Additionally or alternatively, the predetermined length of the character component may be based on the audio length of the word(s) and/or phrase(s) making up the character component. In the context of the present disclosure, the term audio length is understood to mean the length of time it takes for the character component to be spoken, which may be based on an average utterance time determined from utterances recorded from a plurality of individuals. Additionally or alternatively, the audio length may be a function of the number of characters (or syllables) in the character component. In some examples, control circuitry may determine that the audio length of the character component la Estatua de la Libertad exceeds a threshold value for the audio length of the character component. For example, the threshold value for the audio length of the character component may be set to 1 second, such that character components taking less than 1 second to utter are not replaced by an image component, and character components that take longer than 1 second to utter are eligible for substitution. In this manner, character components of a shorter audio length, which may be easier for a user to understand, are not replaced by an image component, and longer character components, which may be more difficult for a user to understand, can be replaced by an image component. In some examples, the threshold value for the audio length of a character component may be set according to one or more settings in a user profile, in a similar manner to that described above. Thus, at step 408, where the character component of the subtitles is greater than a predetermined length, process 400 moves to step 410; otherwise, process 400 may terminate.

At step 410, control circuitry determines whether a character component of the subtitles should be replaced by an image component by determining if the character component is difficult to understand, e.g., in the context of the text of the subtitle. For example, control circuitry may determine a difficulty rating of the character component, which may be based on at least one of a vocabulary acquisition factor, syntax and morphology for fluency factor and phonology for fluency factor. In some cases, it is possible to determine a numerical difficulty rating for the character component, e.g., based on at least one of the preceding factors, or in any other appropriate manner. In a similar manner to that described above, control circuitry may determine that the difficulty rating of the character component la Estatua de la Libertad exceeds a threshold value for the difficulty rating of a character component. In such a case, the character component la Estatua de la Libertad would be eligible for substitution by an image component.

Additionally or alternatively, determining if the character component is difficult to understand may be done by determining a language ability level of a user. For example, the language ability level of a user may be based on a user's language proficiency. In some examples, the language proficiency of the user may be set in a user profile, such that a user may set the level at which a character component becomes eligible for substitution. Additionally or alternatively, control circuitry, e.g., of the user equipment 102, may determine a user's language ability level based on one or more recorded utterances of the user. For example, control circuitry may be configured to analyze user spoken and/or written language to determine a language ability level of a user, e.g., based on one or more standardized proficiency frameworks. Thus, at step 410, where the character component of the subtitles is difficult to understand, process 400 moves to step 412; otherwise, process 400 may terminate.

At step 412, control circuitry determines whether the character component can be, e.g., is able to be, represented by an image component. For example, process 400 may comprise a step of parsing the subtitles of a content item. Parsing the subtitles may allow for the determination of whether one or more character components of the subtitles can be replaced by an image component, e.g., if it is possible for a character component of the subtitles to be substituted by an image. For example, the subtitles may be broken down into any appropriate number and/or type of syntactic categories, such as nouns, adjective and verbs. Where the subtitles comprise a noun, a substitution of the noun is clearly possible, since nouns are often objects, and objects can be readily visualized. However, substitution of an adjective or verb may not always be possible. In some examples, control circuitry may determine whether a word is replaceable by querying the word in an image search. For example, in response to receiving results of the search, control circuitry may analyse the results to determine a level of variance between the images returned as part of the search, e.g., a level of variance between one or more visual characteristics of the images returned as part of the search. Where the level of variance is greater than a threshold level of variance, control circuitry may determine that the word is non-replaceable. For example, where the subtitles comprise the word lovely, an image search for the word lovely may lead to a high level of variance between the images returned as part of the search, indicating that the images for the word lovely are distinct from each other suggesting it is not easily replaceable by an image in a consistent manner. However, where the subtitles comprise the word tree, search results may show a lower level of variance between the images returned as part of the search, indicating that the images are relatively similar, suggesting the word tree is more easily replaceable by an image in a consistent manner.

Additionally or alternatively, control circuitry may determine whether a word is replaceable based on a usage pattern of the word, and/or one or more lexical properties relating to the word based on a usage pattern. For example, control circuitry may determine whether a word is replaceable based on image commonality/universality, e.g., usage patterns relating to words or phrases whose image representation is possible but not sufficiently common/universal to be recognized. This may include an image that is identifiable by one user, but it not known, or even understandable, by another user. For example, a user may recognize the word benzene as a chemical compound, but not know what exactly benzene is. In this example, the word benzene is representable using an image comprising a graphic representation of the molecular structure of benzene, but such an image would not help the user in better understanding of the subtitle unless they are able to understand structural formulae of chemical compounds, for example. One way to determine whether images representing a word are likely to be understood by a user is by accessing a database of images and/or a web page with the images representing the words and determining the type and/or number of users accessing those webpages, e.g., based on user profiles of the users accessing the database/web page. For example, benzene images would be mostly present in databases/webpages related to chemistry and would be accessed by users working in and/or learning chemistry. Where is it determined that only a small number of users may understand an image representative of the word, the word may not be replaced in the subtitle.

If it is determined that none of the character components of a subtitle for a scene can be replaced, process 400 terminates and may restart for the next subtitle. If it is determined that at least one character component of a subtitle for a scene can be replaced, process 400 continues. For example, at step 412, a positive determination is made that the character component la Estatua de la Libertad can be represented by an image, and process 400 moves to step 414.

At step 414 (in FIG. 5), control circuitry accesses metadata of a consumed portion of the media content item for which subtitles are being generated. For example, metadata of the consumed portion may comprise data relating to the visual composition of one or more frames of the content item, e.g., data relating to what images are shown by each frame. In some examples, control circuitry may be configured to download metadata for the media content item, e.g., before or as the content item is being consumed by the user. In some examples, the amount and/or type of metadata downloaded by the control circuitry may depend on whether the character components of the subtitles is difficult to understand, e.g., on the user's ability to understand the language of the subtitles. For example, where the subtitles comprise a large number of character components that the user may find difficult to understand, a large amount of metadata may be transferred to the user equipment 102, e.g., in expectation of a large number of character components requiring substitution by an image component. However, where the subtitles are determined to be relatively easier to understand, control circuitry may access metadata in real-time, e.g., from a content provider's database, since the instances of character components requiring substitution by an image component may be fewer.

At step 416, control circuitry determines whether the consumed portion of the media content item comprises a frame containing an image corresponding to the character component. For example, control circuitry may determine if any of the already-viewed scenes in the movie Titanic comprise an image of the Statue of Liberty, e.g., based on the metadata for those scenes already viewed. Where one or more scenes that the user has already viewed shows an image of the character component in question, e.g., the Statue of Liberty, process 400 moves on to step 418. If none of the scenes that the user has already viewed shows an image of the character component in question, then process 400 moves to step 420.

At step 418, control circuitry selects a frame containing an image corresponding to the character component as an image component for substitution into the subtitles, e.g., based on a comparison between metadata for the frame and the character component. For example, where the character component is the text the Statue of Liberty (or the translation la Estatua de la Libertad), control circuitry may retrieve a frame comprising metadata describing that the frame contains an image of, or refers to, the text of the character component. In the event that the already-viewed portion of the media content item contains multiple scenes showing an image corresponding to the character component, selecting a frame from the plurality of frames as the image component based on at least one of the elapsed time between the display of the frame in the consumed portion of the media content item and the time of the generation of the subtitles, the clarity of the image corresponding to the character component in the frame, and the size of the image in the frame. For example, where the already-viewed portion of the media content item contains two scenes containing an image of the character component, it may be beneficial to substitute into the subtitles an image/frame from the most recently viewed scene, since such an image/frame will be fresher in the viewer's mind. Additionally or alternatively, the quality and/or clarity of the image may be determined, e.g., based on one or more factors such as whether the image fully or partially displays a representation of the character component, the angle at which the image is captured, and the relationship between background/foreground entities and the representation of the character component. For example, control circuitry may use one or more image processing techniques to analyze the image to determine if the image is of appropriate size (large or small) and/or quality (high or low) for substitution into the subtitles. In some examples, even where the already-viewed portion of the media content item contains an image corresponding to the character component, process 400 may move from step 418 to step 420 if none of the available images is appropriate for substitution. Otherwise, process 400 moves to step 424.

Figure 6:
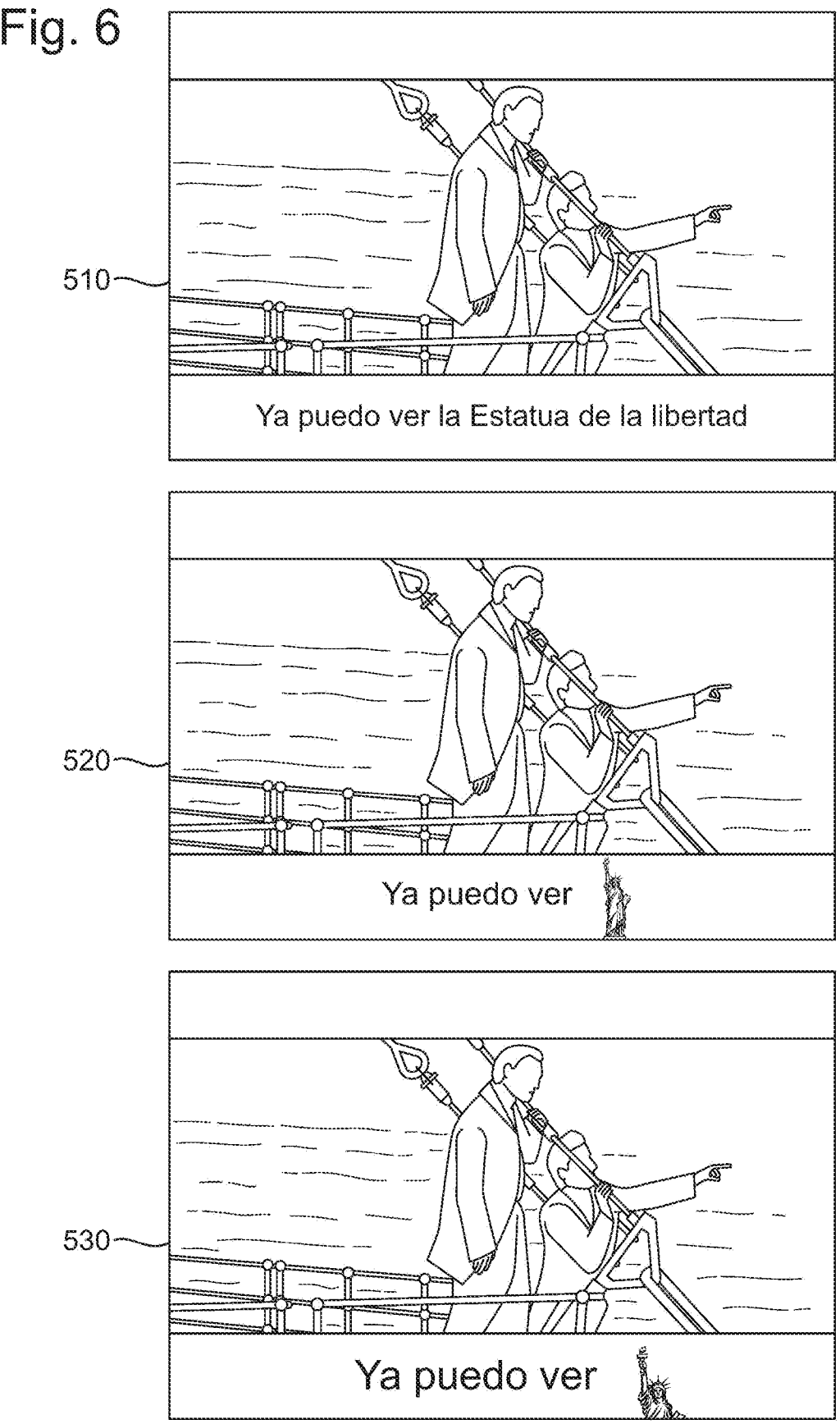
FIG. 6 illustrates various options for displaying modified subtitles while displaying a media content item.

At step 420, control circuitry selects an image corresponding to the character component, e.g., in response to determining that i) the character component of the subtitles should be replaced by an image component, ii) the character component of the subtitles can be replaced by an image component, and iii) an already-viewed portion of the media content item does not comprise a frame containing an image corresponding to the character component (or an appropriate image corresponding to the character component). For example, control circuitry may access one or more image databases to retrieve an image corresponding to the character component that should be replaced. Using the above example, control circuitry may access one or more image databases to retrieve an image for the Statue of Liberty. In some examples, the selection of the image may be based on various factors, such as metadata of the content item and metadata of the image, such that an appropriate image may be selected for use as an image component corresponding to the character component in the subtitles. For example, in many cases, multiple images corresponding to the character component may exist. Where the character component describes an everyday article or a well-known landmark, a large number of images corresponding to the character component may exist. In such a case, control circuitry may select an image best suited for substitution into the subtitles. For example, control circuitry may compare one or more visual properties of the image to the visual properties of the frame/scene onto which the subtitles will be overlaid and/or the format of the display of the subtitles. For example, where the subtitles are generated on a black background, as shown in the example of FIG. 1, a light-colored image may be more suitable, since it contrasts against the black background. Additionally or alternatively, an image may be chosen based on its quality, resolution and/or size. For example, a thumbnail image may be more suitable than a high-resolution image, since a smaller, lower resolution image can be processed by control circuitry in a shorter time, which may be an important factor to consider when processing and generating modified subtitles in real time. In some examples, control circuitry may cause a selected image to be adjusted. For example, control circuitry may cause the selected image to be enlarged, cropped, re-colored and/or adjusted in any appropriate manner, such that the image is suitable for use as an image component in the subtitles, e.g., by matching the font size of the subtitles. For example, FIG. 6 illustrates how an image may be resized for use as an image component to better fit the text of the subtitles. In the example shown in FIG. 6, frame 510 shows conventional textual subtitles, frame 520 shows modified subtitles having an image of the Statue of Liberty substituted for the text la Estatua de la Libertad, and frame 530 shows modified subtitles having an image of the Statue of Liberty substituted for the text la Estatua de la Libertad, the image and the text being adjusted so that the character components and the image component of the modified subtitles appear more cohesive.

In some examples, a database of images may be stored on user equipment 102, e.g., in response to the user selecting playback of a media content item. For example, control circuitry may determine the likelihood of a character component of a subtitle being replaced based on how difficult the subtitles are to understand, e.g., for a specific user. In some examples, control circuitry may retrieve one or more parameters from a user profile to determine a user's language ability level. For example, where a user has requested the display of Spanish subtitles, and their user profile indicates that they have a low proficiency of the Spanish language, control circuitry may download and store a database, e.g., on user equipment 102, having a large number of images, e.g., that may correspond to various character components in the subtitles. In this manner, control circuitry need not frequently retrieve images on demand from a remote server as the modified subtitles are generated. Conversely, where the user profile indicates that a user has a high proficiency of the Spanish language, control circuitry may be configured to download and store a smaller database having fewer images, or to not download a database at all in preference for retrieving images in real time, e.g., from a server of a content provider.

At step 424, control circuitry replaces the character component of the subtitles by the selected image component to generate modified subtitles, e.g., in a similar manner to that described in step 306 of process 300.

At step 426, the modified subtitles are then generated for display on user equipment 102. In this manner, a user may more easily and/or more quickly comprehend the meaning of the subtitles, compared to subtitles comprising only textual content.

The actions or descriptions of FIGS. 4 and 5 may be used with any other example of this disclosure. In addition, the actions and descriptions described in relation to FIGS. 4 and 5 may be done in any suitable alternative orders or in parallel to further the purposes of this disclosure.

The processes described above are intended to be illustrative and not limiting. One skilled in the art would appreciate that the steps of the processes discussed herein may be omitted, modified, combined, and/or rearranged, and any additional steps may be performed without departing from the scope of the invention. More generally, the above disclosure is meant to be exemplary and not limiting. Only the claims that follow are meant to set bounds as to what the present invention includes. Furthermore, it should be noted that the features and limitations described in any one example may be applied to any other example herein, and flowcharts or examples relating to one example may be combined with any other example in a suitable manner, done in different orders, or done in parallel. In addition, the systems and methods described herein may be performed in real time. It should also be noted that the systems and/or methods described above may be applied to, or used in accordance with, other systems and/or methods.

What is claimed is:

1. A method for providing modified subtitles comprising:
obtaining, using control circuitry, subtitles for a media content item;
determining, using the control circuitry, whether a character component of the subtitles is replaceable with an image by:
querying the character component in an image search;
determining a level of variance between images returned as part of the search; and
determining that the character component is replaceable when the level of variance is less than a threshold level of variance;
in response to determining that the character component of the subtitles is replaceable with an image, determining, using the control circuitry, whether to replace the character component of the subtitles by an image component;
selecting, from memory, an image component corresponding to the character component;
replacing, using the control circuitry, the character component of the subtitles with the image component to generate modified subtitles; and
displaying the modified subtitles at user equipment.

2. The method of claim 1, wherein determining whether the character component of the subtitles is replaceable with an image further comprises at least one of:
determining whether the character component is greater than a predetermined length; or
determining whether the character component is difficult to understand.

3. The method of claim 2, wherein the predetermined length comprises at least one of:
a number of characters in the character component; or
an audio length of the character component.

4. The method of claim 2, wherein determining whether the character component is difficult to understand comprises at least one of:
determining a difficulty rating of the character component; or
determining a language ability level of a user.

5. The method of claim 1, further comprising:
translating an audio component of the media content item from a first language into a second language to obtain the subtitles; and
determining if the subtitles comprise a character component that could not be translated into the second language to determine if the character component of the subtitles should be replaced with an image component.

6. The method of claim 1, further comprising:
accessing metadata of the media content item;
accessing a database containing a plurality of images corresponding to the character component; and
selecting one of the plurality of images corresponding to the character component as the image component based on the metadata of the media content item.

7. The method of claim 1, further comprising:
accessing metadata of a consumed portion of the media content item;
determining whether the consumed portion of the media content item comprises a frame containing an image corresponding to the character component based on the metadata; and
in response to determining that the consumed portion of the media content item comprises a frame containing an image corresponding to the character component, selecting the frame as the image component.

8. The method of claim 7, wherein the consumed portion of the media content item comprises a plurality of frames containing an image corresponding to the character component, the method further comprising:
selecting a frame from the plurality of frames as the image component based on at least one of:
an elapsed time between display of the frame in the consumed portion of the media content item and a time of generation of the subtitles;
a clarity of the image corresponding to the character component in the frame; or
a size of the image in the frame.

9. The method of claim 1, further comprising adjusting a visual property of the image component.

10. The method of claim 1 further comprising:
determining, using control circuitry, that the character component of the subtitles relates to a first language; and
determining, using control circuitry, whether the character component of the subtitles translates from the first language to a second language based on a translation score;
wherein determining whether the character component of the subtitles is replaceable further comprises:
determining whether the translation score exceeds a translation threshold.

11. A system for providing modified subtitles, the system comprising:
control circuitry configured to:
obtain subtitles for a media content item;
determine whether a character component of the subtitles is replaceable with an image by:
querying the character component in an image search;
determining a level of variance between the images returned as part of the search; and
determining that the character component is replaceable when the level of variance is less than a threshold level of variance;
in response to determining that the character component of the subtitles is replaceable with an image, determine whether to replace the character component of the subtitles by an image component;
select, from memory, an image component corresponding to the character component;
replace the character component of the subtitles with the image component to generate modified subtitles; and
display the modified subtitles at user equipment.

12. The system of claim 11, wherein, when determining whether the character component of the subtitles is replaceable with an image, the control circuitry is configured to perform at least one of:
determine whether the character component is greater than a predetermined length; or
determine whether the character component is difficult to understand.

13. The system of claim 12, wherein the predetermined length comprises at least one of:
a number of characters in the character component; or
an audio length of the character component.

14. The system of claim 12, wherein, when determining whether to replace the character component of the subtitles by an image component, the control circuitry is configured to perform at least one of:
determining a difficulty rating of the character component; or determining a language ability level of a user.

15. The system of claim 11, wherein the control circuitry is configured to:
- translate an audio component of the media content item from a first language into a second language to obtain the subtitles; and
- determine if the subtitles comprise a character component that could not be translated into the second language to determine if the character component of the subtitles should be replaced with an image component.

16. The system of claim 11, wherein the control circuitry is further configured to:
- access metadata of the media content item;
- access a database containing a plurality of images corresponding to the character component; and
- select one of the plurality of images corresponding to the character component as the image component based on the metadata of the media content item.

17. The system of claim 11, wherein the control circuitry is further configured to:
- access metadata of a consumed portion of the media content item;
- determine whether the consumed portion of the media content item comprises a frame containing an image corresponding to the character component based on the metadata; and
- in response to determining that the consumed portion of the media content item comprises a frame containing an image corresponding to the character component, select the frame as the image component.

18. The system of claim 17, wherein the consumed portion of the media content item comprises a plurality of frames containing an image corresponding to the character component, and wherein the control circuitry is further configured to:
- select a frame from the plurality of frames as the image component based on at least one of:
  - an elapsed time between the display of the frame in the consumed portion of the media content item and a time of the generation of the subtitles;
  - a clarity of the image corresponding to the character component in the frame; or
  - the size of the image in the frame.

19. The system of claim 11, wherein the control circuitry is further configured to adjust a visual property of the image component.

20. The system of claim 11, wherein the control circuitry is further configured to:
- determine that the character component of the subtitles relates to a first language; and
- determine whether the character component of the subtitles translates from the first language to a second language based on a translation score; and
- wherein, when determining whether the character component of the subtitles is replaceable, the control circuitry is configured to determine whether the translation score exceeds a translation threshold.

* * * * *